US012452905B2

(12) United States Patent
Priyanto et al.

(10) Patent No.: US 12,452,905 B2
(45) Date of Patent: Oct. 21, 2025

(54) UPLINK SHARED CHANNEL ASSIGNMENT IN TWO-STEP RANDOM ACCESS PROCEDURE

(71) Applicant: Sony Group Corporation, Tokyo (JP)

(72) Inventors: Basuki Priyanto, Lund (SE); Anders Berggren, Lund (SE)

(73) Assignee: Sony Group Corporation, Tokyo (JP)

( * ) Notice: Subject to any disclaimer, the term of this patent is extended or adjusted under 35 U.S.C. 154(b) by 719 days.

(21) Appl. No.: 17/625,384

(22) PCT Filed: Jul. 9, 2020

(86) PCT No.: PCT/EP2020/069413
§ 371 (c)(1),
(2) Date: Jan. 7, 2022

(87) PCT Pub. No.: WO2021/028127
PCT Pub. Date: Feb. 18, 2021

(65) Prior Publication Data
US 2022/0256611 A1  Aug. 11, 2022

(30) Foreign Application Priority Data

Aug. 14, 2019 (SE) .................................. 1930267-8

(51) Int. Cl.
*H04W 74/00* (2009.01)
*H04W 72/12* (2023.01)
(Continued)

(52) U.S. Cl.
CPC ......... *H04W 74/002* (2013.01); *H04W 72/12* (2013.01); *H04W 74/0836* (2024.01);
(Continued)

(58) Field of Classification Search
CPC . H04W 74/0833; H04W 72/12; H04W 76/10; H04W 72/23; H04W 74/002; H04W 74/006
See application file for complete search history.

(56) References Cited

U.S. PATENT DOCUMENTS

| 9,949,298 B1 | 4/2018 | Akoum |
| 2018/0279376 A1 | 9/2018 | Dinan |

(Continued)

FOREIGN PATENT DOCUMENTS

| CN | 108282899 A | 7/2018 |
| CN | 108282901 A | 7/2018 |

(Continued)

OTHER PUBLICATIONS

Shen et al., "Uplink Shared Channel Configuration Method for Random Access Random Channel Access Method, and Apparatus", Nov. 19, 2020, WO, WO-2020228544 (Year: 2020).*

(Continued)

*Primary Examiner* — Michael K Phillips
(74) *Attorney, Agent, or Firm* — Tucker Ellis LLP

(57) ABSTRACT

Methods (400; 500) of operating a wireless communication device (101) and of operating an access node (112) of a communication network (100) during a two-step random access procedure are provided. The methods (400; 500) comprise communicating (401; 501), from the access node (112) to the wireless communication device (101), a message comprising a configuration defining at least one of multiple different types of scheduling usable for resource allocation of an uplink shared channel (211) of the communication network (100). An uplink message (2117) of the two-step random access procedure includes a connection request for establishing a data connection between the wireless communication device (101) and the communication network (100), and is communicated (407; 507) on the (Continued)

uplink shared channel (211) in accordance with the configuration.

19 Claims, 5 Drawing Sheets

(51) Int. Cl.
*H04W 74/0836* (2024.01)
*H04W 76/10* (2018.01)
*H04W 72/23* (2023.01)
*H04W 74/0833* (2024.01)
*H04W 74/0838* (2024.01)

(52) U.S. Cl.
CPC ............ *H04W 76/10* (2018.02); *H04W 72/23* (2023.01); *H04W 74/006* (2013.01); *H04W 74/0833* (2013.01); *H04W 74/0838* (2024.01)

(56) References Cited

U.S. PATENT DOCUMENTS

| | | | |
|---|---|---|---|
| 2019/0357265 A1 | 11/2019 | Ren | |
| 2020/0100297 A1* | 3/2020 | Agiwal | H04W 52/365 |
| 2020/0112994 A1* | 4/2020 | Zhang | H04L 27/2607 |
| 2020/0221503 A1 | 7/2020 | Kusashima | |
| 2020/0236717 A1* | 7/2020 | Sun | H04W 72/21 |
| 2020/0314917 A1* | 10/2020 | Jeon | H04W 74/0833 |
| 2020/0351801 A1* | 11/2020 | Jeon | H04W 52/48 |
| 2021/0014898 A1* | 1/2021 | Lei | H04L 1/0004 |
| 2021/0051726 A1* | 2/2021 | Xu | H04W 76/27 |
| 2021/0345416 A1* | 11/2021 | Hu | H04W 74/0833 |
| 2021/0345424 A1* | 11/2021 | Cirik | H04W 72/23 |
| 2022/0070938 A1* | 3/2022 | Wu | H04L 5/0094 |
| 2022/0191939 A1* | 6/2022 | Christoffersson | H04W 56/0045 |
| 2022/0191948 A1* | 6/2022 | Lei | H04L 5/0051 |
| 2022/0210842 A1* | 6/2022 | Lei | H04L 5/0051 |
| 2022/0240326 A1* | 7/2022 | Rune | H04W 72/046 |
| 2022/0368468 A1* | 11/2022 | Xiong | H04W 76/11 |
| 2024/0179747 A1* | 5/2024 | Agiwal | H04W 24/08 |
| 2024/0314848 A1* | 9/2024 | Xiong | H04L 5/0094 |

FOREIGN PATENT DOCUMENTS

| | | | |
|---|---|---|---|
| CN | 109964434 A | 7/2019 | |
| WO | 2018175809 A1 | 9/2018 | |
| WO | WO-2019064768 A1 | 4/2019 | |
| WO | WO-2020228544 A1 * | 11/2020 | ............ H04W 72/23 |

OTHER PUBLICATIONS

International Search Report from corresponding International Application No. PCT/EP2020/069413, mailed on Sep. 28, 2020, 4 pages.
Office Action and Search Report from corresponding Swedish Application No. 1930267-8, mailed on Mar. 17, 2020, 8 pages.
Motorola, "Random Access Procedure", 3GPP RAN1 LTE Adhoc, R1-061708, May 8-12, 2006, 2 pages.

* cited by examiner

UPLINK SHARED CHANNEL ASSIGNMENT IN TWO-STEP RANDOM ACCESS PROCEDURE

TECHNICAL FIELD

Various examples relate to methods of operating a wireless communication device and of operating an access node of a communication network during a two-step random access procedure.

BACKGROUND

In 3GPP standardization, a procedure for a two-step random access in wireless communication networks has recently been proposed to further reduce latency and signaling with regard to a legacy four-step random access procedure.

In principle, the two-step random access procedure comprises all four messages of the four-step random access procedure, but transfers the four messages in only two signaling steps. A first step (msgA) of the proposed procedure includes first and third steps (Msg1, Msg3) of the known procedure, which respectively comprise a random access preamble (Msg1) followed by a connection request (Msg3). A second step (msgB) of the proposed procedure includes second and fourth steps (Msg2, Msg4) of the known procedure, which respectively comprise a random access response (RAR) and a connection response. In other words, the proposed two-step random access procedure comprises an uplink step involving uplink messages, as well as a downlink step involving downlink messages. The contents of msgA and msgB are discussed in 3GPP RAN2, and a channel structure to carry msgA and msgB is discussed in 3GPP RAN1.

A main issue in connection with the first step (MsgA) relates to identification and allocation of transmission occasions (i.e., time-frequency resources) for the uplink data (Msg3) in an uplink shared channel by a User Equipment (UE). Multiple different types of scheduling usable for resource allocation are conceivable, which may or may not be associated with transmission occasions for random access preambles.

Considering that a wireless communication network needs to serve use cases as different as Enhanced Mobile Broadband (eMBB), massive Machine-Type Communication (mMTC) and Ultra Reliability and Low Latency Communication (URLLC) and to provide these services reliably as well (i.e., by avoiding/minimizing collisions), the newly proposed two-step random access procedure requires a flexible assignment of transmission occasions.

SUMMARY

This need is met by the features of the independent claims. The features of the dependent claims define preferred or advantageous embodiments.

In a first aspect, a method of operating a wireless communication device is provided. The method comprises: receiving, from an access node of a communication network, a message comprising a configuration defining at least one of multiple different types of scheduling usable for resource allocation of an uplink shared channel of the communication network during a two-step random access procedure, and transmitting an uplink message of the two-step random access procedure on the uplink shared channel in accordance with the configuration. The uplink message includes a connection request for establishing a data connection between the wireless communication device and the communication network.

The method may further comprise: selecting between a first type of scheduling and a second type of scheduling of the multiple different types of scheduling in accordance with the configuration.

The method may further comprise: transmitting, to the access node, an indication of a result of the selecting.

The indication may be transmitted using a partitioning of random access preambles of the random access procedure between the multiple different types of scheduling.

The selecting may depend on a modulation and/or coding scheme associated with the first type of scheduling and the second type of scheduling, respectively, in accordance with the configuration.

The selecting may depend on a transport block size associated with the first type of scheduling and the second type of scheduling, respectively, in accordance with the configuration.

The selecting may depend on a resource size associated with the first type of scheduling and the second type of scheduling, respectively, in accordance with the configuration.

The uplink message may further include uplink payload data, and the selecting may depend on a comparison of a size of the uplink payload data and the resource size associated with the first type of scheduling and the second type of scheduling, respectively.

The selecting may depend on an operational mode of the wireless communication device towards the communication network.

The selecting may depend on a device category associated with the wireless communication device.

The method may further comprise: receiving, from the access node, a selection command indicative of a selection between the first type of scheduling and the second type of scheduling of the multiple different types of scheduling in accordance with the selection command, and disabling the first type of scheduling or the second type of scheduling of the multiple different types of scheduling in accordance with the selection indicated by the selection command.

The selection command may be included in a paging message associated with the random access procedure.

The selection command may be included in a connection release message for releasing the data connection.

The configuration may be received in at least one of a broadcasted system information block and a downlink control message addressed to the wireless communication device.

In a second aspect, a method of operating an access node of a communication network is provided. The method comprises: transmitting, to a wireless communication device, a message comprising a configuration defining at least one of multiple different types of scheduling usable for resource allocation of an uplink shared channel of the communication network during a two-step random access procedure, and receiving an uplink message of the two-step random access procedure on the uplink shared channel in accordance with the configuration. The uplink message includes a connection request for establishing a data connection between the wireless communication device and the communication network.

The method may further comprise: selecting between a first type of scheduling and a second type of scheduling of the multiple different types of scheduling, and transmitting, to the wireless communication device, a selection command indicative of the selection between the first type of scheduling and the second type of scheduling of the multiple different types of scheduling.

The selecting may depend on an application associated with the data connection.

The first type of scheduling may define an occasion for transmitting the uplink message on the uplink shared channel with reference to an occasion for transmitting a random access preamble of the two-step random access procedure on a random access channel. The second type of scheduling may define the occasion for transmitting the uplink message on the uplink shared channel with reference to a framing of a time-frequency resource grid defined by the communication network.

In a third aspect, a wireless communication device is provided. The device comprises: a processing unit being arranged for receiving, from an access node of a communication network, a message comprising a configuration defining at least one of multiple different types of scheduling usable for resource allocation of an uplink shared channel of the communication network during a two-step random access procedure, and transmitting an uplink message of the two-step random access procedure on the uplink shared channel in accordance with the configuration. The uplink message includes a connection request for establishing a data connection between the wireless communication device and the communication network.

The processing unit of the wireless communication device may be arranged for performing the method of operating the wireless communication device according to various embodiments.

In a fourth aspect, an access node of a communication network is provided. The access node comprises: a processing unit being arranged for transmitting, to a wireless communication device, a message comprising a configuration defining at least one of multiple different types of scheduling usable for resource allocation of an uplink shared channel of the communication network during a two-step random access procedure, and receiving an uplink message of the two-step random access procedure on the uplink shared channel in accordance with the configuration. The uplink message includes a connection request for establishing a data connection between the wireless communication device and the communication network.

The processing unit of the access node may be arranged for performing the method of operating the access node of the communication network according to various embodiments.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
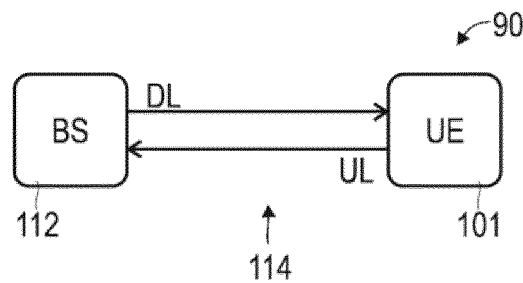
FIG. 1 schematically illustrates communication between a UE and a BS on a wireless link according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

FIG. 1 schematically illustrates a wireless communication system 90 that may benefit from the techniques disclosed herein. The communication system 90 includes a User Equipment (UE) 101 and an access node of a network, here implemented by a base station (BS) 112 of a cellular network. As a general rule, the techniques described herein may be applied to networks of various kinds and types: The network may be a 3GPP-standardized network such as 3G, 4G-LTE, or 5G-NR. Other examples include 3GPP Narrowband Internet of Things (NB-IoT), enhanced Machine Type Communication (eMTC) or IEEE Wi-Fi networks.

A wireless link 114 is established between the BS 112 and the UE 101. The wireless link 114 includes a downlink (DL) from the BS 112 to the UE 101; and further includes an uplink (UL) from the UE 101 to the BS 112.

The wireless link 114 may be implemented on a dedicated spectrum. The dedicated spectrum may be fully controlled by the network operator.

The UE 101 may e.g. be one of the following: a smartphone; a cellular phone; a tablet; a notebook; a computer; a smart TV; an MTC device; an eMTC device; an IoT device; an NB-IoT device; a sensor; an actuator; etc.

Figure 2:
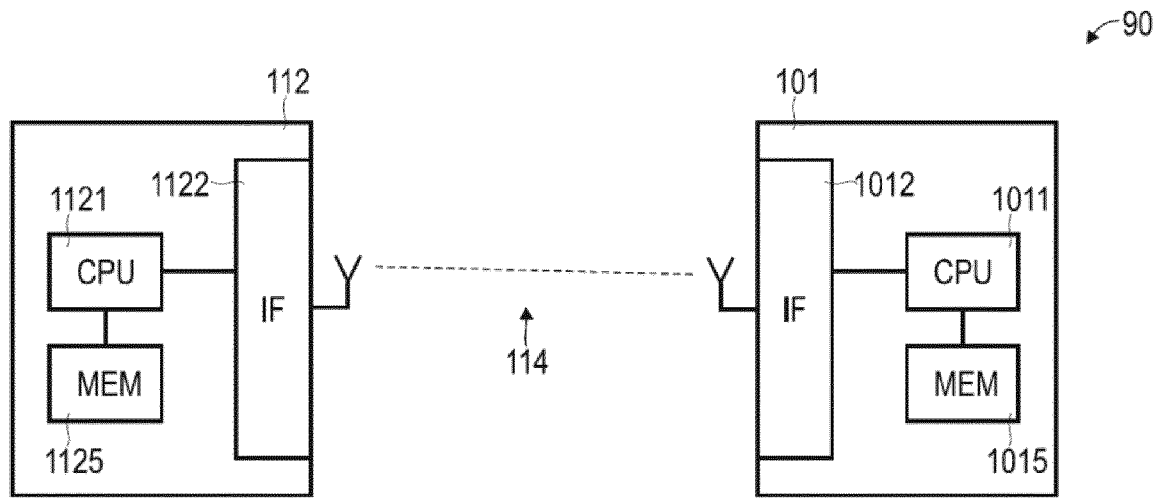
FIG. 2 schematically illustrates the UE and the BS in further detail according to various examples.

FIG. 2 schematically illustrates the BS 112 and the UE 101 in more detail.

The BS 112 includes a processor (CPU) 1121 and an interface (IF) 1122, sometimes also referred to as frontend. The IF 1122 includes a receiver and a transmitter. The BS 112 further includes a memory (MEM) 1125, e.g., a non-volatile memory. The memory may store program code that can be executed by the processor 1121. Thus, the processor 1121 and the memory 1125 form a control circuitry. Executing the program code may cause the processor 1121 to perform steps of methods of operating an access node 112 of a communication network 100 according to various embodiments.

The UE 101 includes a processor (CPU) 1011 and an interface (IF) 1012, sometimes also referred to as frontend. The IF 1012 includes a receiver and a transmitter. The UE 101 further includes a memory (MEM) 1015, e.g., a non-volatile memory. The memory 1015 may store program code that can be executed by the processor 1011. Thus, the processor 1011 and the memory 1015 form a control circuitry. Executing the program code may cause the processor 1011 to perform steps of methods of operating a wireless communication device 101 according to various embodiments.

Figure 3:
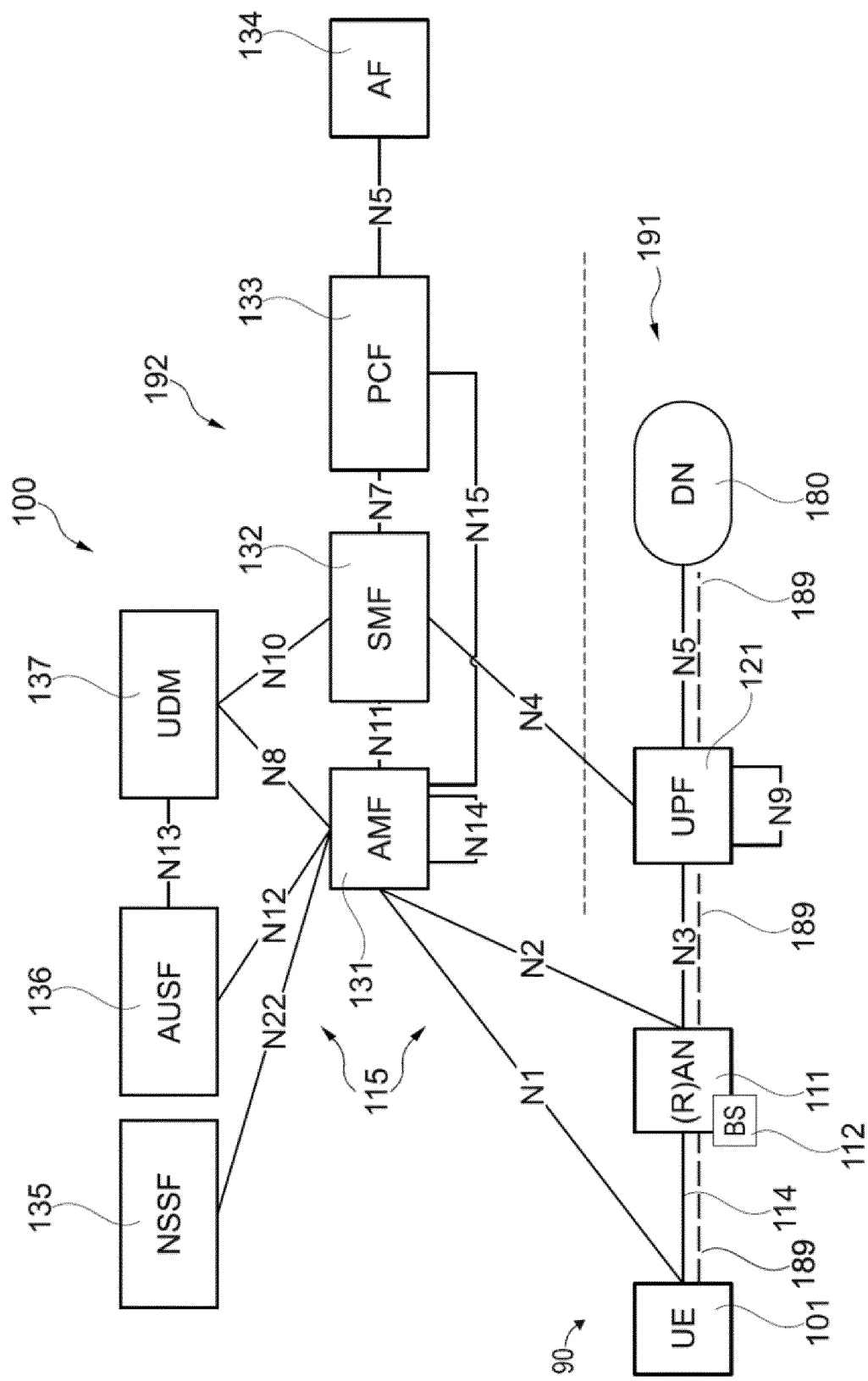
FIG. 3 schematically illustrates aspects with respect to a cellular network according to various examples.

FIG. 3 schematically illustrates an example implementation of the wireless communication network 100 in greater detail. The example of FIG. 3 illustrates a wireless network 100 according to the 3GPP 5G architecture. Details of the fundamental architecture are described in 3GPP TS 23.501, version 1.3.0 (2017-09). While FIG. 3 and further parts of the following description illustrate techniques in the 3GPP 5G framework, similar techniques may be readily applied to different communication protocols. Examples include 3GPP LTE 4G and IEEE Wi-Fi technology.

The UE 101 is connectable to the wireless communication network 100 via a radio access network (RAN) 111, typically formed by one or more BSs 112. The wireless link 114 is established between the RAN 111—specifically between one or more of the BSs 112 of the RAN 111—and the UE 101, thereby implementing the communication system 90 (cf. FIG. 1).

The RAN 111 is connected to a core network (CN) 115. The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 3, the UPF 121 acts as a gateway towards a data network (DN) 180, e.g., the Internet or a Local Area Network. Application data can be communicated between the UE 101 and one or more servers on the DN 180.

The network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; and a Unified Data Management (UDM) 137. FIG. 3 also illustrates the protocol reference points N1-N22 between these nodes.

The AMF 131 provides one or more of the following functionalities: registration management; NAS termination; connection management; reachability management; mobility management; access authentication; and access authorization The AMF 131 may keep track of the timing of a Discontinuous Reception (DRX) cycle of the UE 101. The AMF 131 may keep track of various network registration modes in which the UE 101 can operate. The AMF 131 may trigger transmission of paging signals to the UE 101 by the BSs 112 of the RAN 111, e.g., in a tracking area or registration area, to account for UE mobility.

A data connection 189 is established by the AMF 131 if the respective UE 101 operates in a connected mode. To keep track of the current network registration mode of the UEs 101, the AMF 131 sets the UE 101 to Evolved Packet System Connection Management (ECM) connected or ECM idle. During ECM connected, a non-access stratum (NAS) connection is maintained between the UE 101 and the AMF 131. The NAS connection implements an example of a mobility control connection. The NAS connection may be set up in response to paging of the UE 101.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc.

As such, the AMF 131 and the SMF 132 both implement CP mobility management needed to support a moving UE.

FIG. 3 also illustrates aspects with respect to the data connection 189. The data connection 189 is established between the UE 101 via the RAN 111 and the UPF 121 of the CN 115 and towards the DN 180. For example, a connection with the Internet or another packet data network can be established. To establish the data connection 189, it is possible that the respective UE 101 performs a random access (RA) procedure, e.g., in response to reception of a paging signal. A server of the DN 180 may host a service for which application data (sometimes also referred to as payload data) is communicated via the data connection 189. The data connection 189 may include one or more bearers such as a dedicated bearer or a default bearer. The data connection 189 may be defined on the Radio Resource Control (RRC) layer, e.g., generally Layer 3 of the OSI model of Layer 2.

Figure 4:
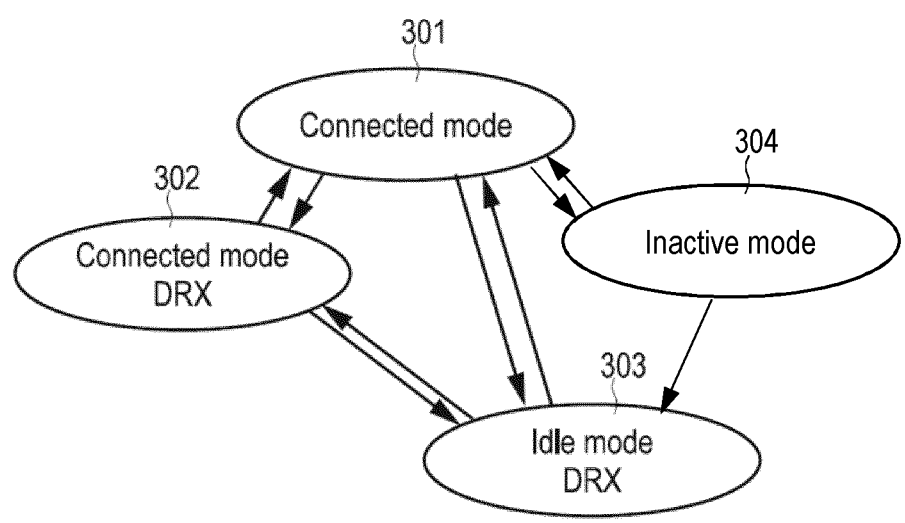
FIG. 4 schematically illustrates multiple network registration modes of the UE at the cellular network according to various examples.

FIG. 4 illustrates aspects with respect to different network registration modes 301-304 in which the UE 101 can operate. Example implementations of the operational modes 301-304 are described, e.g., in 3GPP TS 38.300, e.g., version 15.0.

In connected mode 301, control and user plane connectivity are established between the UE 101 and the CN 115. This includes that the data connection 189 is set up. For example, a default bearer and optionally one or more dedicated bearers may be set up between the UE 101 and the network 100. The receiver of the UE 101 may persistently operate in an active state. The connected mode 301 comprises network-controlled UE mobility.

In order to reduce the power consumption, it is then possible to transition from the connected mode 301 to a connected mode 302 which employs a DRX cycle of the receiver. The DRX cycle includes ON periods and OFF periods, according to a respective timing schedule. During the OFF periods, the receiver is unfit to receive data; an inactive state of the receiver may be activated.

The timing schedule of the DRX cycle is synchronized between the UE 101 and the BS 112 such that the network 100 can align any DL transmission—e.g., of application data—with the ON periods of the connected mode DRX cycle. Thus, the ON periods denote periods in which the UE 101 monitors the PDCCH for potential indication of DL traffic by the network 100. The data connection 189 is maintained set-up in mode 302.

To achieve a further power reduction, it is possible to operate the UE 101 in idle mode 303.

The idle mode 303 is, again, associated with the DRX cycle of the receiver of the UE 101. However, during the on durations of the DRX cycle in idle mode 303, the receiver is only fit to receive paging indicators and, optionally, paging messages. For example, this may help to restrict the particular bandwidth that needs to be monitored by the receiver during the on durations of the DRX cycles in idle mode 303. The receiver may be unfit to receive application data. This may help to further reduce the power consumption—e.g., if compared to the connected mode 302. In the idle mode 303 the UE further performs cell reselection when detecting that given cell reselection criteria are met.

In inactive mode 304, the control and user plane connectivity between the UE 101 and the CN 115 is maintained (as in connected mode 301), and the UE 101 performs cell reselection (as in idle mode 303). In doing so, the UE 101 may move within a notification area configured by the RAN 111 without notifying the RAN 111, and paging is initiated by the RAN 111. This further reduces signaling and the power consumption relating thereto in view of new use cases such as Enhanced Mobile Broadband (eMBB), massive Machine-Type Communication (mMTC) and Ultra Reliability and Low Latency Communication (URLLC).

Figure 5A:
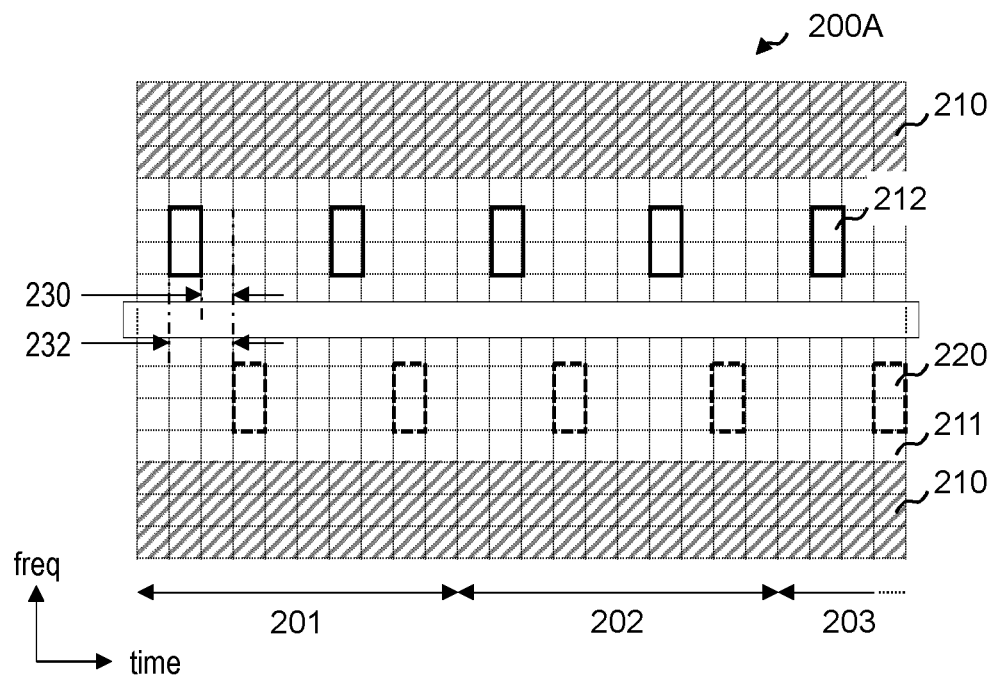
FIGS. 5A and 5B schematically illustrate time-frequency resource grids in an uplink of the wireless link according to various examples.
Figure 5B:
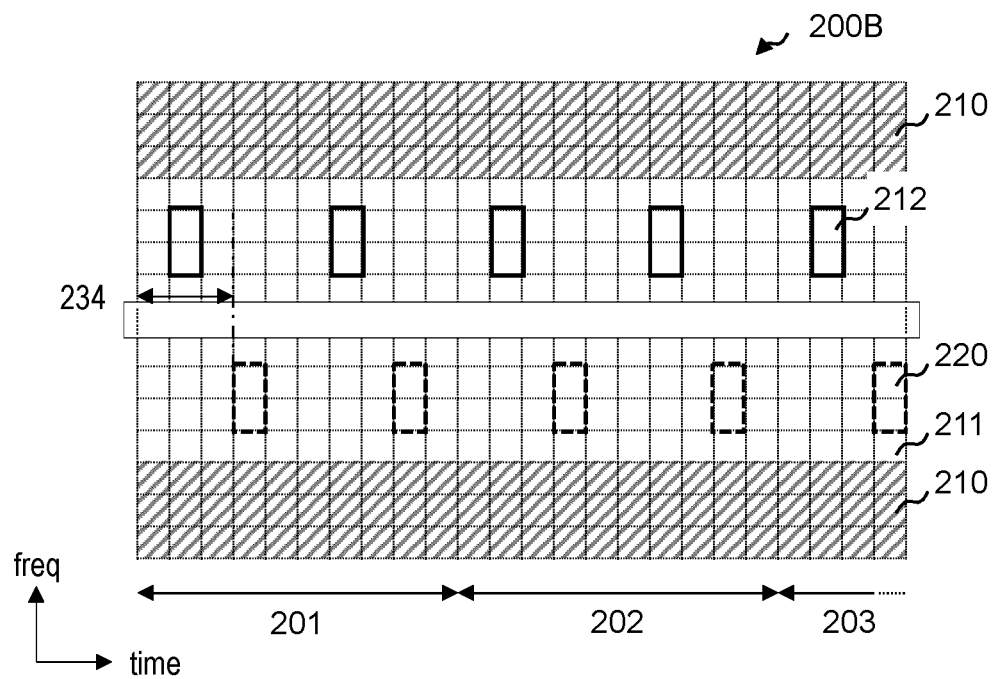

FIGS. 5A, 5B schematically illustrate aspects with respect to time-frequency resource grids 200A, 200B in an uplink of the wireless link 114 including multiple time-frequency resource elements. The time-frequency resource grid 200 is defined by the RAN 111, in accordance with a respective RAT, for communication on the wireless link 114 in an UL direction.

The time-frequency resource elements of the time-frequency resource grids 200A, 200B are defined by symbols and subcarriers according to the OFDM modulation. Further, the time-frequency resource elements are structured in time domain. For this, a framing/frame structure comprising transmission frames 201-203 is provided. The transmission frames 201-203 may further be subdivided into subframes and timeslots (not shown). For example, a frame may include multiple, for example ten (10), subframes and a given subframe may include one or more, for example one (1), timeslot, and each slot may include fourteen (14) OFDM symbols.

As a general rule, each frame 201-203 of a framing has a certain sequence number known as System Frame Number (SFN). The sequence numbers of the frames 201-203 can implement a time reference for the respective cellular network 100. Additionally, subframes within a frame and/or slots within a subframe may have certain sequence numbers. Synchronization signals indicative of the time reference can be communicated (not illustrated in FIGS. 5A, 5B).

FIGS. 5A, 5B also illustrate aspects with respect to multiple channels 210-212. In particular, different channels 210-212 can be associated with different time-frequency resource elements. Different channels 210-212 can be used for different types of signals. Different channels can use different modulation and coding schemes. A corresponding framing scheme exists for DL communication.

A first channel (shaded area in FIGS. 5A, 5B)—e.g., implemented by the Physical UL Control Channel (PUCCH) 210—is an UL control channel. The PUCCH 210 could e.g. include scheduling requests, e.g., implemented by a buffer status report (BSR). This can trigger scheduling at the BS 112. Then, a scheduling grant on a Physical DL Control Channel (PDCCH) (not shown in FIGS. 5A, 5B) can be used to indicate allocations 220 on a second channel (non-shaded area in FIGS. 5A, 5B)—e.g., implemented by a Physical UL Shared Channel (PUSCH) 211, and therefore so-called PUSCH occasions (PO) 220. The PUSCH is associated with payload UL messages carrying higher-layer data. For example, higher-layer messages may include application payload data, or RRC control messages relating to control of the network registration modes 301—304 in which the UE 101 can operate. In particular, a PUSCH occasion may comprise multiple PUSCH resource units (PRU), which may for example be used when the UE 101 transmits both preamble (in PRACH) and payload data (in PUSCH), or when different UEs use different radio access preambles (i.e. preamble indices) which map to different PRUs within the same PUSCH occasion.

A third channel (thick solid line in FIGS. 5A, 5B)—e.g., implemented by the Physical Random Access Channel (PRACH) 212—may be used by the UE 101, and possibly other UEs 101 at the same time, to transmit a random access preamble and thereby initiate a random access procedure for a establishing control and data plane connectivity between the UE 101 and the CN 115. The network 100 may broadcast system information (i.e., SIB2) defining those time-frequency resource elements of the time-frequency resource grid 200 which are assigned to the PRACH 212 and in which random access preambles may be transmitted—so-called Random Access occasions (RO) 212. Signaling may be reduced by pre-defining various preamble formats and resource assignments, which may be referenced and looked up using a PRACH configuration index.

The reference signs 230-234 are further illustrated in connection with FIG. 6 (see below).

In a DL, a fourth channel (not shown in FIGS. 5A, 5B)—e.g., implemented as the Physical DL Control Channel (PDCCH) 213—may carry DL control signals. Examples include paging indicators, which enable the cellular network 100—e.g., the AMF 131—to page a UE 101 during a paging occasion. The PDCCH 213 may also carry scheduling grants/assignments, sometimes referred to as DL control information (DCI), on a fifth channel (not shown in FIGS. 5A, 5B)—e.g., implemented by the Physical DL Shared Channel (PDSCH) 214. The PDSCH 214 is associated with payload DL messages carrying higher-layer data. For example, higher-layer messages may include application data, or RRC control messages, such as paging messages. The paging messages can be indicative of the identities of the particular UE to be paged.

Figure 6:
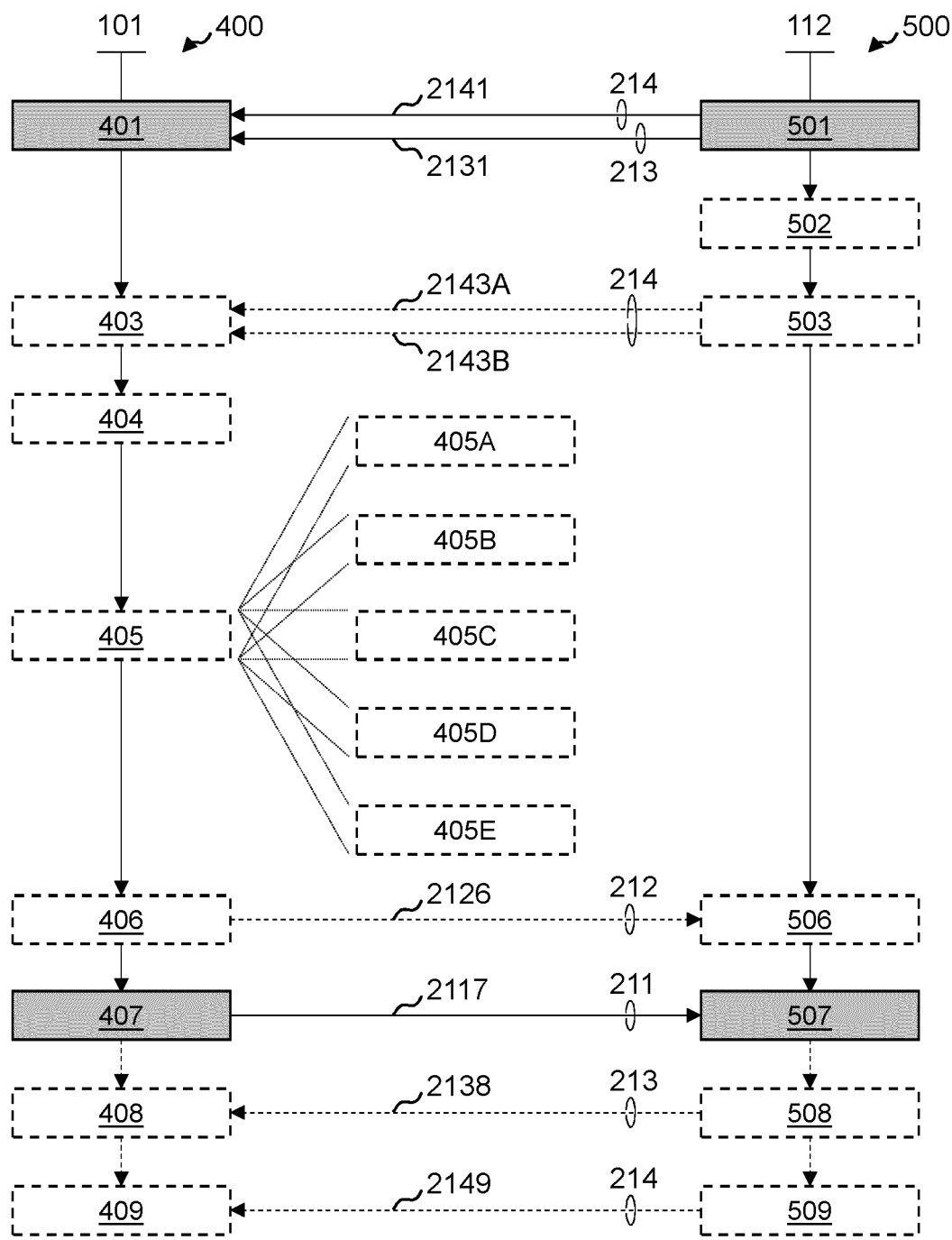
FIG. 6 illustrates flowcharts of methods according to various examples.

FIG. 6 illustrates flowcharts of interrelated methods 400, 500 according to various examples. The methods relate to operation of a wireless communication device 101 and operation of an access node 112 respectively, of a communication network 100. In particular, the wireless communication device 101 may be a User Equipment (UE), and the access node 112 may be a base station (BS).

In FIG. 6, essential steps of the above-mentioned methods are indicated by solid lines/boundaries and highlighted by shaded areas.

Configuration of Multiple Different Types of Scheduling

At block 501, the method 500 comprises the access node/base station 112 transmitting 501, to the wireless communication device 101, a message comprising a configuration defining at least one of multiple different types of scheduling usable for resource allocation of an uplink shared channel 211 of the communication network 100 during a two-step random access procedure.

As used herein, a type of scheduling may relate to a configuration set by the network 100, in particular by the respective access node 112, and informing the wireless communication device 101 how to identify transmission occasions for uplink transmission during the two-step random access procedure in the Physical Uplink Shared CHannel (PUSCH).

As used herein, a shared channel may relate to at least one recurring time-frequency resource element of the time-frequency resource grid 200 whose temporary and mutually exclusive use by a plurality of UEs 101 is controlled by the respective access node 112 based on appropriate scheduling.

As used herein, a "random access procedure" is a signaling/handshake between a wireless communication device 101 and an access node 112 in a wireless communication network 100 which initializes establishment of control and data plane connectivity between the wireless communication device 101 and the wireless communication network 100. In other words, the random access procedure precedes and prepares a transfer of payload data.

Correspondingly, at block 401, the method 400 comprises the wireless communication device 101 receiving 401, from the access node 112, the message comprising a configuration defining at least one of multiple different types of scheduling usable for resource allocation of the uplink shared channel 211 of the communication network 100 during the two-step random access procedure. The configuration may be received in at least one of a broadcasted system information block 2141 (via PDSCH 214) and a downlink control message 2131 (via PDCCH 213), such as an RRC message, addressed to the wireless communication device 101. In particular, the configuration information may be split into parts being communicated 401, 501 via the broadcasted system information block 2141 and the downlink control message 2131, respectively. For example, at least an availability of multiple different types of scheduling and a default configuration may be communicated 401, 501 via a system broadcast message 2141. Further configuration details, such as pre-allocated PUSCH opportunities or any time and/or frequency dependencies between PRACH and PUSCH opportunities (see below), may also be informed or updated via UE-specific downlink control messages 2131, i.e., RRC messages.

No matter how the wireless communication device 101 is configured with the multiple different types of scheduling, it is provided with a choice regarding the scheduling usable for resource allocation of the uplink shared channel 211 of the communication network 100 during the two-step random access procedure. In other words, within the scope of the two-step random access procedure, the access node 112 may delegate a final selection among multiple types of uplink scheduling to the wireless communication device(s) 101. Nevertheless, there may be circumstances where the access node 112 may want to temporarily or permanently enforce that the wireless communication device(s) 101 use a particular one of the previously configured multiple different types of scheduling.

To this end, at block 502, the method 500 may further comprise the access node 112 selecting 502 between a first type of scheduling and a second type of scheduling of the multiple different types of scheduling. The selecting 503 may depend on an application associated with the data connection. For example, the second type of scheduling may be selected for use in an NR-Unlicensed network due to a need for a Listen Before Talk (LBT) technique, i.e., a technique used in radio communications whereby a radio transmitter first senses its radio environment before it starts a transmission.

At block 503, the method 500 may further comprise the access node 112 transmitting 503, to the wireless communication device 101, a selection command indicative of the selection 503 between the first type of scheduling and the second type of scheduling of the multiple different types of scheduling.

Correspondingly, at block 403, the method 400 may further comprise the wireless communication device 101 receiving 403, from the access node 112, a selection command indicative of a selection 502 between the first type of scheduling and the second type of scheduling of the multiple different types of scheduling in accordance with the selection command.

At block 404, the method 400 may further comprise the wireless communication device 101 disabling 404 the first type of scheduling or the second type of scheduling of the multiple different types of scheduling in accordance with the selection indicated by the selection command. The selection command may be included in a paging message 2143A (via the PDSCH 214) associated with the random access procedure, if the wireless communication device 101 is in the idle mode 303 (mobile terminating case). Alternatively, the selection command may be included in a connection release message 2143B (via the PDSCH 214) for releasing data connectivity, if the wireless communication device 101 is in the connected mode 301 or in the connected mode 302 which employs a DRX cycle of the receiver. As used herein, the terms "disabling" and "enabling" may refer to "not enabling" and "not disabling", respectively.

In other words, the access node 112 may reduce the number of available options of the wireless communication device 101 for selecting 405 one of the multiple different types of scheduling usable for resource allocation, which step is described next. It should be noted that the network 100 may configure a particular one of the multiple different types of scheduling usable for resource allocation by disabling all but one options for the selection step 405.

Selection from Multiple Different Types of Scheduling

At block 405, the method 400 may further comprise the wireless communication device 101 selecting 405 between a first type of scheduling and a second type of scheduling of the multiple different types of scheduling in accordance with the configuration. The first type of scheduling may define a PUSCH occasion 220 (see FIG. 5A) for transmitting 407 an uplink message 2117 on the uplink shared channel (PUSCH) 211 with reference to a PRACH occasion (see reference signs 212 in FIG. 5A) for transmitting 406 a random access preamble 2126 of the two-step random access procedure on a random access channel (PRACH) 212. FIG. 5A illustrates a possible definition of the respective PUSCH occasion 220 with reference 230, 232 to the preceding PRACH occasion 212. PUSCH occasions 220 may be defined with reference 232 to a beginning of the preceding PRACH occasion 212, or with reference 230 to an end thereof (see FIG. 5A). Alternative examples with implied periodicity in accordance with the PRACH occasions 212 are conceivable, wherein POs 220 may be provided in arbitrary subframes of arbitrary frames, but consistently with reference to the PRACH occasions 212. By contrast, the second type of scheduling defines the PUSCH occasion 220 (see FIG. 5B) for transmitting 407 the uplink message 2117 on the uplink shared channel (PUSCH) 211 with reference 234 to a framing of a time-frequency resource grid 200 defined by the communication network 100, i.e., with no direct reference to any PRACH occasion (see reference signs 212 in FIG. 5B) for transmitting 406 the random access preamble 212b of the two-step random access procedure on the random access channel 212. FIG. 5B illustrates a possible definition of the PUSCH occasions 220 with reference to a beginning of a system frame. In the particular example, a PUSCH occasion (PO) 220 is provided in subframes 3 and 8 of every frame 201-203. Alternative examples with implied periodicity are conceivable, wherein POs 220 may be provided in arbitrary subframes/slots of arbitrary frames. Further examples with an implied offset from a beginning of a system frame 201-203 are conceivable, wherein POs 220 may be provided with an offset of N subframes/slots from the beginning of a system frame 201-203.

At block 405, the selecting 405A may additionally or alternatively depend on a modulation and/or coding scheme (MCS) associated with the first type of scheduling and the second type of scheduling, respectively, in accordance with the configuration. For example, the first type of scheduling may be associated with BPSK/QPSK, and the second type of scheduling may be associated with higher-order modulation such as 16QAM and above.

As used herein, a "modulation and/or coding scheme" may relate to a particular choice of modulation order and code rate used for physical-layer encoding.

At block 405, the selecting 405B may additionally or alternatively depend on a transport block size (TBS) associated with the first type of scheduling and the second type of scheduling, respectively, in accordance with the configuration. For example, the first type of scheduling may be associated with a TBS of up to 100 bits, and the second type of scheduling may be associated with a larger TBS, such as up to 1000 bits. Accordingly, if a UE requires transmission of small data already during connection establishment, then it may use the second type of scheduling.

As used herein, a "transport block size" may relate to a number of bits, including Medium Access Control (MAC) header and payload, which can be transmitted per subframe (i.e., per Millisecond).

At block 405, the selecting 405C may additionally or alternatively depend on a resource size associated with the first type of scheduling and the second type of scheduling, respectively, in accordance with the configuration. The uplink message 2117 may further include uplink payload data, and the selecting 405C may depend on a comparison of a size of the uplink payload data and the resource size associated with the first type of scheduling and the second type of scheduling, respectively.

As used herein, a "resource size" may relate to an extension in the time-frequency resource grid 200 in both frequency and time. In terms of frequency, the resource size may be represented as a number of sub-carrier(s). In terms of time, the resource size may be represented as a number of subframes and/or slots. For example, as the smallest unit of resource that can be allocated to a user in LTE networks is a resource block (RB) which has a size of 12 subcarriers and one slot, so that the resource size may also be represented as a number of resource blocks (RB) in such networks.

At block 405, the selecting 405 may additionally or alternatively depend on a coverage enhancement (CE) mode associated with the first type of scheduling and the second type of scheduling, respectively, in accordance with the configuration. For example, the first type of scheduling may be associated with a particular CE mode, and the second type of scheduling may be associated with another CE mode (or none at all).

As used herein, a "coverage enhancement mode" relates to a transmission mode implying a number of transmission repetitions, such that each data packet is repeated tens, hundreds or even thousands of times to improve chances of successful transmission. In particular, different CE modes imply different numbers of transmission repetitions.

At block 405, the selecting 405D may additionally or alternatively depend on an operational mode 301—304 (see FIG. 3) of the wireless communication device 101 towards the communication network 100.

For example, in idle mode 303 the first type of scheduling may be used by default, and the second type of scheduling may be used for specific use cases, such as unlicensed operation, or early/small data transmission, as indicated in via system information.

For example, upon entering the inactive mode 304, use of the first type of scheduling or of the second type of scheduling may be configured by the network 110, e.g. by including a selection command in a connection release message 2143B for releasing the data connection.

For example, in connected mode 301 the configuration of multiple different types of scheduling may dynamically be changed to temporarily enable/disable particular ones of the multiple different types of scheduling. In particular, the first type of scheduling may be used upon radio link failures (for extensive radio link failures, a fallback to a four-step random access procedure may be envisaged, however), and the second type of scheduling may particularly be used upon handover procedures from a source access node 112 to a target access node 112, wherein the source access node 112 may prepare the UE 101 with the configuration of multiple different types of scheduling that applies for the target access node 112.

At block 405, the selecting 405E may additionally or alternatively depend on a device category associated with the wireless communication device 101. For example, mMTC UEs which may require transmission repetitions may select the first type of scheduling (assuming that this scheduling type supports an appropriate CE mode).

Msg1 (RA Preamble)

At block 406, the wireless communication device 101 transmits a random access preamble 2126 to the access node 112 to thereby initiate the two-step random access procedure. To this end, the wireless communication device 101 selects an appropriate one of a set of random access preambles given by the network 100, selects an appropriate one of one or more available periodic PRACH occasions provided/configured by the network 100 for transmitting 406 a random access preamble 2126 of the two-step random access procedure on a random access channel (PRACH) 212, and transmits the selected preamble 2126 in the selected PRACH occasion. In NR networks, this message is known as Msg1.

At block 406, the method 400 may further comprise transmitting 406 to the access node 112 an indication of a result of the selecting 405; 405A-405E. The indication may be transmitted 406 using a partitioning of the random access preambles of the random access procedure between the multiple different types of scheduling. A similar partitioning is known in NR networks, wherein a fixed number (64) of preamble signatures is available in each NR cell, and wherein these signatures are partitioned between those for contention-based access and those for allocation to specific UEs on a contention-free basis. By way of derogation, in the partitioning used herein, the random access preambles may be used to differentiate between the multiple different types of scheduling. For example, preamble indices 0-32 and 33-63 may stand for the first type of scheduling and the second type of scheduling of the multiple different types of scheduling, respectively (or vice versa).

Correspondingly, at block 506, the access node 112 receives the random access preamble 2126 from the wireless communication device 101 in the chosen PRACH occasion.

In the conventional four-step random access procedure, upon successful detection of a random access preamble in a PRACH occasion, the receiving access node 112 would schedule an UL resource, i.e., a PUSCH occasion 220, and optionally provide Timing Advance (TA) information. In LTE networks, this information would be sent to the wireless communication device 101 in a DL message known as Msg2. In response, one or more wireless communication devices 101 that have sent the same random access preamble 2126 would transmit an RRC Connection Request, their unique identity (UE ID) and a buffer status report (BSR) in the PUSCH occasion 220. In LTE networks, this message is known as Msg3.

Msg3 (RRC Connection Request)

In contrast to the above-mentioned conventional approach, at block 407, the method 400 comprises the wireless communication device 101 transmitting 407 the uplink message 2117 (corresponding to LTE's Msg3) of the two-step random access procedure in the uplink shared channel (PUSCH) 211 in accordance with the configuration previously received 401 from the network 100.

More specifically, according to the methods 400, 500, a time and/or frequency offset of the PUSCH occasion 220 to be used for the uplink message 2117 is defined in accordance with one of the multiple different types of scheduling selected 405 by the wireless communication device 101 and enabled (i.e., not disabled 404) by the access node 112. In other words, the PUSCH occasion 220 to be used for Msg3 may be defined with reference to (i.e., relative to) the PRACH occasion, or independently/separately thereof.

For example, according to a first type of scheduling of the multiple different types of scheduling, the time and/or frequency offset of the PUSCH occasion 220 to be used for the uplink message 2117 relative to the chosen PRACH occasion may depend on (i.e., be a function of) an index of the selected random access preamble 2126. For example, a preamble index of N may be associated with a PUSCH resource unit (PRU) N of a PUSCH occasion. In other words, the respective PUSCH occasion may be sliced into PRUs in accordance with a preamble index. The configuration of the first one of multiple different types of scheduling may comprise this dependency of the time and/or frequency offset of the PUSCH occasions 220, for example as a lookup table (LUT). The time and/or frequency offset of the PUSCH occasions 220 may be defined relative to a start time or an end time of the chosen PRACH occasion.

The above-referenced first type of scheduling reduces connection control signaling by pre-configuring PUSCH occasions relative to PRACH occasions, so that based on the selected PRACH occasion the PUSCH occasion to be used for the uplink message 2117 is pre-defined.

For example, according to a second type of scheduling of the multiple different types of scheduling, the PUSCH occasion 220 to be used for the uplink message 2117 may be independent of any PRACH occasion. The network 100 may establish recurring PUSCH occasions 220 separately, which may be defined based on and relative to a given framing (described above and in FIG. 5B). For instance, PUSCH occasions may be provided in every $M^{th}$ system frame, optionally shifted/offset by N system frames, where M and N are reconfigurable integer values. Within a system frame, there may be multiple PUSCH occasions. As such, the separately established PUSCH occasions and PRACH occasions may or may not be incident simultaneously. The configuration of the second one of multiple different types of scheduling may comprise information on the established recurring PUSCH occasions 220, for example as a list, as a LUT, or as a formula/equation that yields the next available PUSCH occasion for a current SFN.

The above-referenced second type of scheduling reduces connection control signaling by pre-configuring PUSCH occasions relative to the system framing, so that based on the current system frame number (SFN), subframe number and slot number the next available PUSCH occasion to be used for the uplink message 2117 is pre-defined.

It may be beneficial to use a particular one of the multiple different types of scheduling as a default mode where most of the UEs employ it, and to use another one of the multiple different types of scheduling as an alternative based upon payload attributes or device attributes/states. A possible scenario could be using the first type of scheduling of the multiple different types of scheduling by default, for example to schedule PUSCH occasions for legacy Msg3 messages. The second type of scheduling of the multiple different types of scheduling could be used whenever a larger transport block size (TBS) is required, or if transmission repetitions are needed, for example.

The configuration of multiple different types of scheduling enables the respective access node 112 to define multiple different types of scheduling and to dynamically enable/disable/switch between the multiple different types of scheduling depending on use case(s) and changing circumstances at the access node 112.

The configuration of multiple different types of scheduling enables further enables the wireless communication device 101 to use each one of the enabled multiple different types of scheduling individually or simultaneously, and to dynamically switch between the enabled multiple different types of scheduling depending on use case and changing circumstances at the device 101.

As in legacy LTE's or NR's Msg3, the uplink message 2117 comprises an RRC Connection Request, a unique identity (UE ID) and a buffer status report (BSR) of the wireless communication device 101. Additionally, the uplink message 2117 may further include uplink payload data, such as small data.

Correspondingly, at block 507, the method 500 comprises the access node 112 receiving 507 the uplink message 2117 of the two-step random access procedure on the uplink shared channel (PUSCH) 211 in accordance with the configuration.

In the two-step random access procedure defined for NR networks, the first step MsgA comprises the combination of Msg1 and Msg3.

Msg2 (RA Response)

At block 508, upon successful detection of a random access preamble 2126 in a PRACH occasion at block 506, the receiving access node 112 schedules an UL resource, i.e., a PUSCH occasion 220, and transmits 508 a DL message 2138 via the PDCCH 213 comprising a corresponding random access response (RAR) as well as optional Timing Advance (TA) information for the wireless communication device 101. In LTE networks, this message is known as Msg2.

Correspondingly, at block 408, the wireless communication device 101 receives 408 the DL message 2138.

Msg4 (RRC Response/Connection Setup Complete)

At block 509, the access node 112 selects an identity (UE ID) one of the one or more wireless communication devices 101 that have sent the same random access preamble 2126, and transmits 509 an RRC Response/Connection Setup Complete message 2149 (via PDSCH 214) including the selected identity to that wireless communication device 101 for contention resolution. In LTE networks, this message is known as Msg4.

Correspondingly, at block 409, the wireless communication device 101 receives 409 the RRC Response/Connection Setup Complete message 2149 including the selected identity. Only if the selected identity corresponds to the unique identity (UE ID) of the wireless communication device 101, the identified wireless communication device 101 acknowledges the reception of the contention resolution (not illustrated in FIG. 6).

In the two-step random access procedure defined for NR networks, the second step MsgB comprises the combination of Msg2 and Msg4.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various examples have been described with respect to a wireless communication device and an access node/base station (BS) of a cellular network communicating on a licensed spectrum. The BS acts as a scheduler for the UE. As a general rule, it would be possible that similar techniques are applied to other devices, e.g., a wireless communication device and an access node of a non-cellular network.

For further illustration, various examples have been described with respect to a two-step random access procedure involving four messages, which are sequenced Msg1>Msg3>Msg2>Msg4 in FIG. 6. However, one skilled in the art will appreciate that the two-step random access procedure may also involve Msg1 and Msg3 being transmitted concurrently, and/or Msg2 and Msg4 being transmitted concurrently, for example.

The invention claimed is:

1. A method of operating a wireless communication device, the method comprising:
    before a two-step random access procedure, receiving, from an access node of a communication network, a message comprising a configuration defining at least one of multiple different types of scheduling that differ in how an occasion for transmitting the uplink message is defined, and that are usable for resource allocation of an uplink shared channel of the communication network during the two-step random access procedure, the configuration informing the wireless communication device how to identify the occasion for uplink transmission on the uplink shared channel during the two-step random access procedure, and
    enabling transmission of an uplink message of the two-step random access procedure on the uplink shared channel in accordance with the configuration, the uplink message including a connection request for establishing a data connection between the wireless communication device and the communication network.

2. The method of claim 1, further comprising:
    selecting between a first type of scheduling and a second type of scheduling of the multiple different types of scheduling in accordance with the configuration.

3. The method of claim 2, further comprising:
    transmitting, to the access node, an indication of a result of the selecting.

4. The method of claim 3, wherein the indication is transmitted using a partitioning of random access preambles of the random access procedure between the multiple different types of scheduling.

5. The method of claim 2, wherein the selecting depends on a modulation and/or coding scheme associated with the first type of scheduling and the second type of scheduling, respectively, in accordance with the configuration.

6. The method of claim 2, wherein the selecting depends on a transport block size associated with the first type of scheduling and the second type of scheduling, respectively, in accordance with the configuration.

7. The method of claim 2, wherein the selecting depends on a resource size associated with the first type of scheduling and the second type of scheduling, respectively, in accordance with the configuration.

8. The method of claim 7, wherein the uplink message further includes uplink payload data, wherein the selecting depends on a comparison of a size of the uplink payload data and the resource size associated with the first type of scheduling and the second type of scheduling, respectively.

9. The method of claim 2, wherein the selecting depends on an operational mode of the wireless communication device towards the communication network.

10. The method of claim 2, wherein the selecting depends on a device category associated with the wireless communication device.

11. The method of claim 2, further comprising:
    receiving, from the access node, a selection command indicative of a selection between the first type of scheduling and the second type of scheduling of the multiple different types of scheduling in accordance with the selection command, and
    disabling the first type of scheduling or the second type of scheduling of the multiple different types of scheduling in accordance with the selection indicated by the selection command.

12. The method of claim 11, wherein the selection command is included in a paging message associated with the random access procedure.

13. The method of claim 11, wherein the selection command is included in a connection release message for releasing the data connection.

14. The method of claim 1, wherein the configuration is received in at least one of a broadcasted system information block and a downlink control message addressed to the wireless communication device.

15. The method of claim 2, wherein the first type of scheduling defines the occasion for transmitting the uplink message on the uplink shared channel with reference to an occasion for transmitting a random access preamble of the two-step random access procedure on a random access channel, and wherein the second type of scheduling defines the occasion for transmitting the uplink message on the uplink shared channel with reference to a framing of a time-frequency resource grid defined by the communication network.

16. A method of operating an access node of a communication network, the method comprising:
    before a two-step random access procedure, transmitting, to a wireless communication device, a message comprising a configuration defining at least one of multiple different types of scheduling that differ in how an occasion for transmitting the uplink message is defined, and that are usable for resource allocation of an uplink shared channel of the communication network during the two-step random access procedure, the configuration informing the wireless communication device how to identify the occasion for uplink transmission on the uplink shared channel during the two-step random access procedure, receiving the uplink message of the two-step random access procedure on the uplink shared channel in accordance with the configuration, the uplink message including a connection request for establishing a data connection between the wireless communication device and the communication network.

17. The method of claim 16, further comprising:
selecting between a first type of scheduling and a second type of scheduling of the multiple different types of scheduling, transmitting, to the wireless communication device, a selection command indicative of the selection between the first type of scheduling and the second type of scheduling of the multiple different types of scheduling.

18. The method of claim 17, wherein the selecting depends on an application associated with the data connection.

19. The method of claim 17, wherein the first type of scheduling defines the occasion for transmitting the uplink message on the uplink shared channel with reference to an occasion for transmitting a random access preamble of the two-step random access procedure on a random access channel, and wherein the second type of scheduling defines the occasion for transmitting the uplink message on the uplink shared channel with reference to a framing of a time-frequency resource grid defined by the communication network.

\* \* \* \* \*